(12) United States Patent
Rajsic (10) Patent No.: US 7,643,499 B2
(45) Date of Patent: Jan. 5, 2010

(54) EXTENDING IP/MPLS SERVICES REACHABILITY OVER ATM BACKBONE NETWORKS

(75) Inventor: Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 534 days.

(21) Appl. No.: 11/477,614

(22) Filed: Jun. 30, 2006

(65) Prior Publication Data

US 2008/0002699 A1    Jan. 3, 2008

(51) Int. Cl.
*H04L 12/00* (2006.01)
(52) U.S. Cl. .................. 370/401; 370/410; 370/392
(58) Field of Classification Search .......... 370/389, 370/395.1, 395.2, 395.5, 395.51, 395.6, 392, 370/400, 401, 410; 709/249
See application file for complete search history.

(56) References Cited

U.S. PATENT DOCUMENTS

| | | | | |
|---|---|---|---|---|
| 5,796,736 | A * | 8/1998 | Suzuki | 370/254 |
| 6,859,842 | B1 * | 2/2005 | Nakamichi et al. | 709/238 |
| 7,333,509 | B1 * | 2/2008 | Gadagottu | 370/467 |
| 2004/0208191 | A1 * | 10/2004 | Rajsic et al. | 370/409 |
| 2005/0243833 | A1 * | 11/2005 | Choudhury et al. | 370/395.1 |
| 2006/0164975 | A1 * | 7/2006 | Filsfils et al. | 370/225 |

OTHER PUBLICATIONS

Demizu et al., "VCID: Virtual connection identifier", Network Working Group Internet Draft: draft-demizu-mpls-vcid-01.txt, Oct. 1997.*
Nagami et al., "VCID notification over ATM link for LDP", Network Working Group Request for Comments: 3038, Jan. 2001.*

* cited by examiner

*Primary Examiner*—Jayanti K Patel
*Assistant Examiner*—Matthew Campbell
(74) *Attorney, Agent, or Firm*—Kramer & Amado, P.C.

(57) ABSTRACT

The invention enables an LSP or embedded LSPs to be mapped directly to an SPVC and carried over the ATM network. A unidirectional SPVC is established by associating it to a particular ingress LSP at the SPVC source endpoint on a multi-service switch, and to an egress LSP on the SPVC destination endpoint on another multi-service switch. The information necessary to establish the SPVC is appended in the SPVC setup message and includes LSP specific information such as the far end router ID and LSP label information, be it transport label or the full label stack. The information in the modified setup message is then used by the destination endpoint to find and connect the SPVC to the correct LSP. Incoming traffic from the LSP is switched to the SPVC at the source endpoint. The SPVC carries this traffic through the ATM network, and then the traffic is switched to the egress LSP when it emerges from the ATM network at the destination endpoint.

15 Claims, 5 Drawing Sheets

EXTENDING IP/MPLS SERVICES REACHABILITY OVER ATM BACKBONE NETWORKS

FIELD OF THE INVENTION

The invention is directed to communication networks and in particular to extending IP/MPLS service reachability over ATM backbone networks.

BACKGROUND OF THE INVENTION

The telecommunication industry today is almost entirely focused on transporting ATM services over an MPLS core. However, there is interest from current ATM backbone service providers to make use of that backbone to provide enhanced services such as additional IP/MPLS services. In addition, the total footprint of ATM backbone networks today is much larger than MPLS based networks (node counts, etc.), since MPLS networks are relatively in a development stage. There are some markets and regions in the world where there exists ATM footprint and transport, but not yet full IP/MPLS or Ethernet. Therefore, it could be convenient to transport some IP/MPLS based services over existing ATM backbones instead of installing new equipment at all sites.

There is a need to extend the reach of IP/MPLS based services over an ATM backbone consisting of multi-service switches, without requiring the nodes to participate in the full PE function of the IP/MPLS based service, or without requiring an ATM link between the MPLS network and the ATM network.

Specifically, there is a need to provide a means for transporting an MPLS LSP or an LSP stack over an ATM backbone using a single SPVC or a SVC. Once an IP/MPLS service can be extended to locations currently using an ATM backbone, basic IP/MPLS based services could more conveniently be interconnected with minimal IP/MPLS service interoperability of a full PE node.

SUMMARY OF THE INVENTION

It is an object of the invention to extend IP/MPLS service reachability over existing ATM core networks.

It is another object of the invention to merge SPVC technology with MPLS LSPs in a transporting roll of IP/MPLS services.

Accordingly, the invention provides a method of transporting MPLS protocol data units (PDU) from a first MPLS network to a destination in a second MPLS network across an ATM network, the method comprising: establishing a source endpoint and a destination endpoint, the endpoints being provided on a respective source and destination multi-service switch connected at the edge of the ATM network; at the source endpoint, generating a modified setup signal for identifying path for a virtual circuit across the ATM network from the source endpoint to the destination endpoint; and c) transporting within the modified setup signal LSP specific data from the first endpoint to the second endpoint for enabling transporting the MPLS PDUs to the destination.

The invention also provides a multi-service switch connected at the edge of an ATM network for extending IP/MPLS service reachability over an ATM network, comprising: means for configuring a source endpoint for a virtual circuit originating at the switch; a MPLS table for maintaining an association between ingress label information used by MPLS PDUs received at the source endpoint and LSP specific data; a source mapping table for maintaining an association between ingress label information used by MPLS PDUs received at the source endpoint and identification data for the virtual circuit; means for generating a modified setup message by appending the LSP specific data to a virtual circuit setup message and transmitting the modified setup message over the ATM network to a destination endpoint in the ATM network; and means for mapping the MPLS PDUs from received at the source endpoint to ATM PDUs using the source mapping table, and transmitting the ATM PDUs from the source endpoint to the destination endpoint over the virtual circuit.

The invention is also directed to a multi-service switch connected at the edge of an ATM network for extending IP/MPLS service reachability over an ATM network, comprising: means for configuring a destination endpoint for a virtual circuit terminating on the switch; a destination mapping table for maintaining an association between identification data for the virtual circuit and egress label information used by MPLS PDUs transmitted from the destination endpoint; means for generating a connect message in response to a modified setup message for establishing the virtual circuit between a source endpoint of the virtual circuit in the ATM network and the destination endpoint; and means for mapping ATM PDUs received over the virtual circuit to MLS PDUs using the destination mapping table, and transmitting the MPLS PDU's over an egress LSP.

Advantageously, the invention allows service providers to extend MPLS based services (any type of service that rides over an LSP, e.g. VPLS, IP VPNs, pseudo wires, etc.) over an ATM backbone to locations or regions where using the ATM backbone makes more sense. New services can now reach locations where the ATM backbone is more prevalent or where newer technologies such as Ethernet over POS, are more slowly being introduced (e.g. Eastern Europe, Middle East, Africa, Russia, China).

Another advantage of the LSP transport capability of the invention is that it enables the provision of a new type of service offering to customers, namely an LSP L2 service. For example, carriers looking for adding services that can be carried over an existing ATM/multi-service backbone could benefit by offering "LSP trunking" services. A service provider can now assign a particular LSP with specific service categories and bandwidth requirements to an SPVC that matches those service categories for transport, and another LSP with different characteristics to another SPVC. This LSPs to multiple SPVC mappings are not currently available.

Also, this solution does not require more costly ATM cards on PE or P routers of the MPLS network, as per the existing solutions. Rather, less expensive Ethernet or POS can be used from the MPLS edge to the ATM network, from the same multi-service switches that already exist in the ATM network. The lower costs are also due to the fact that there is no need for ATM configuration/ management overhead on the MPLS networks.

Still further, the invention enables additional uses for the installed base of multi-service switches. As the PNNI and SPVC networks continue to grow, more service providers will find this LSP transport capability as an attractive service offering for their current L2 customers. Being able to carry "LSP" based services over an ATM backbone, without needing to participate in a complete PE or P type function within the ATM network, removes many of the current roadblocks to allowing multi-service switches to carry or transport new IP/MPLS based services.

Furthermore, the MLPS services are resiliently transported over an ATM backbone, since there is no single point of failure between the MPLS and ATM networks with the method and system of the invention. This is because the multi-service switch runs both the MPLS and ATM control planes in a single platform: a fast reroute (FRR) can be provided on the MPLS side of the LSP to SPVC connection, and SPVC reroutes can occur on the ATM side. Similarly, automatic protection switching (APS) is not needed between the MPLS network and the ATM network, since these FRR or SPVC reroute mechanisms can be utilized for protection.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
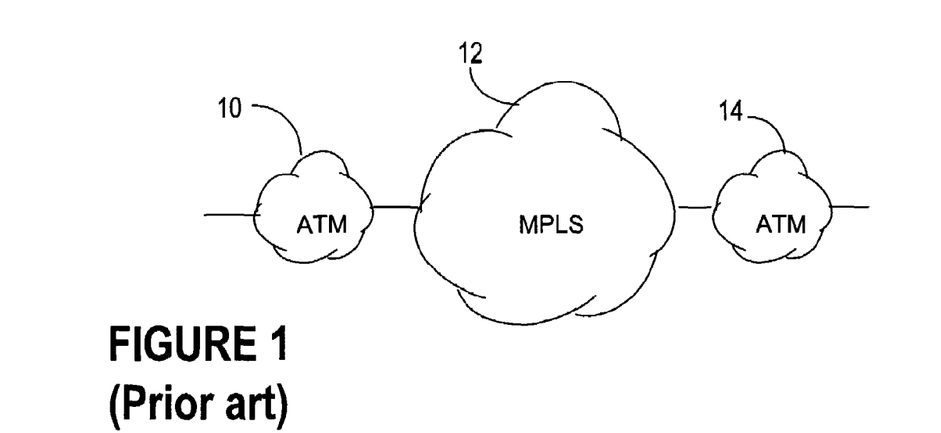
FIG. 1 illustrates an example of interworking ATM networks over a MPLS network (prior art)

FIG. 1 shows a typical ATM/MPLS interworking application well understood by the industry, in which two ATM networks 10 and 14 are interconnected via an MPLS network 12. A brief description of the types of networks under consideration and the most relevant terms needed for understanding the invention are presented next.

ATM is a cell switching and multiplexing technology that combines the benefits of circuit switching (guaranteed capacity and constant transmission delays) with those of packet switching (flexibility and efficiency for Internet traffic). An ATM network, such as network 10 of FIG. 1, includes ATM switches and ATM endpoints. An ATM switch reads and updates the cell header information and quickly switches it from the input interface to the output interface towards a destination. An ATM endpoint includes ATM network interface adapters. A virtual channel (VC) is a concept used to describe uni/bidirectional transport of ATM cells associated by a common unique identifier value. A VC must be set-up across the ATM network prior to any data transfer.

Three types of ATM services exist, namely permanent virtual circuits (PVC), switched virtual circuits (SVC) and switched permanent virtual circuits (SPVC). A PVC or SPVC is similar to a permanent leased line service, while an SVC is created and released dynamically on demand as bandwidth is required, i.e. it remains in use as long as data is being transferred.

In this specification, a PVC or SPVC is considered a point-to-point connection (although point-to-multi-point connections are possible), configured ahead of time, i.e. before end-users may communicate. Such a connection carries a series of channel links that are interconnected by cross-connections setup on the ATM switches. For PVCs, an operator sets-up the route through the network by manually configuring each cross-connection in each ATM switch along the desired data (or traffic) path, or a network management system (NMS) automatically selects the route according to some routing objective and configures each cross-connection accordingly. As PVCs use preconfigured circuit paths, they can fail if the respective path is interrupted. For a soft Permanent Virtual Circuit (SPVC) the operator needs to provide only the ingress and egress network nodes and associated ingress endpoint in the source network node, and egress endpoint in the destination network node and the cross-connects in the middle of the network are commissioned using a signaling protocol such as the Private Network-to-Network Interface (PNNI) protocol (http://www.mfaforum.org/ftp/pub/approved-specs/af-pnni-0055.002.pdf). As such, a SPVC is a PVC that can be rerouted when a failure occurs, if its respective path is interrupted. Relevant to this invention are the SPVCs and SVCs services, as they use dynamic means of establishing connections in the middle of the network.

Two types of ATM connections exist: virtual paths (VP), identified by a VP identifier (VPI) and virtual channels (VC), identified by a combination of the VPI and a VC identifier (VCI); a VP may carry many VCs. The switch looks up the connection value (VPI/VCI) extracted from the cell header in a local translation table to determine the outgoing port of the connection and the new VPI/VCI value of the connection on that link. Then the switch retransmits the cell on that outgoing link with the new identifiers. As such, the VPIs/VCIs are remapped at each switch along the path.

Multiprotocol Label Switching (MPLS) is a data-carrying mechanism which emulates some properties of a circuit-switched network over a packet-switched network. MPLS operates at an OSI Model layer that is generally considered to lie between traditional definitions of Layer 2 (data link layer) and Layer 3 (network layer). It was designed to provide a unified data-carrying service for both circuit-based clients and packet-switching clients which provide a datagram service model. It can be used to carry many different kinds of traffic, including IP packets, as well as native ATM, SONET and Ethernet frames.

An MPLS network, such as network 12 in FIG. 1, works by prepending packets with an MPLS header, containing one or more labels known as a label stack. The MPLS labeled packets are switched based on a label lookup of the first label in the label stack, instead of a lookup into IP tables, so that the switching of the datagrams is made faster since it take place directly in the fabric of a router and not in the CPU. The entry and exit points of an MPLS network are called Label Edge Routers (LER) or PE (Provider Edge) routers. The routers that perform routing based only on label switching are called Label Switching Routers (LSR) or P (Provider) routers. The job of a P router is significantly easier than that of a PE router, so they can be less complex and may be more dependable because of this.

When an unlabeled packet (or any of a number of other kinds of payload packet) enters an ingress PE router and needs to be passed on to an MPLS tunnel, the router first determines the forwarding equivalence class FEC (e.g. VPN IPv4/IPv6 address prefix, RSVP-TE Session, Layer 2 Circuit ID) the packet should be in, and then inserts the label stack in the packet's newly created MPLS header. The labelled packets in a particular FEC are then passed on along a path established through one or more P routers; this path is called a label switched path (LSP). Based on the contents of the labels, a swap (label swapped with a new label), push (new label is pushed on top of the existing label) or pop (label is removed) operation can be performed at each transit (P) router based on prebuilt lookup tables that determine the kind of the necessary processing. During these operations, the content of the packet below the MPLS label stack is not examined, since a P router only needs to examine the topmost label of the stack. The packet leaves the MPLS network at an egress PE router, where all relevant labels are popped and only the payload remains. The egress PE router must therefore have routing information for the packet's payload; a P router has no such requirement.

As indicated above, it is customary to transport ATM services over an MPLS core. This is an important application of the MPLS core, however, what if it is the MPLS services that need to be transported, instead of ATM? What if there is an ATM network between MPLS clouds, as in FIG. 2? There is a need to transport IP/MPLS services over an ATM core instead of ATM services over an MPLS core.

One such method of transporting IP/MPLS over an existing ATM network includes running a concurrent IP/MPLS based overlay network over the ATM network using multi-service switches. In this specification, a multi-service switch is a switch/router that supports both the ATM control protocols (e.g. PNNI signaling and routing) and the IP/MPLS control protocols (e.g. RSVP, OSFP, etc.). In such an architecture, the multi-service switches must participate in PE type functionality as well. The problem with this approach is that the multi-service switches may not be compatible or interoperable with their primary IP/MPLS PE vendors, or may not be as feature rich as needed in this scenario. As a result, among other reasons like political reasons, most carriers are reluctant to enable IP/MPLS services on multi-service switches that are already providing support for their ATM backbones.

Figure 2:
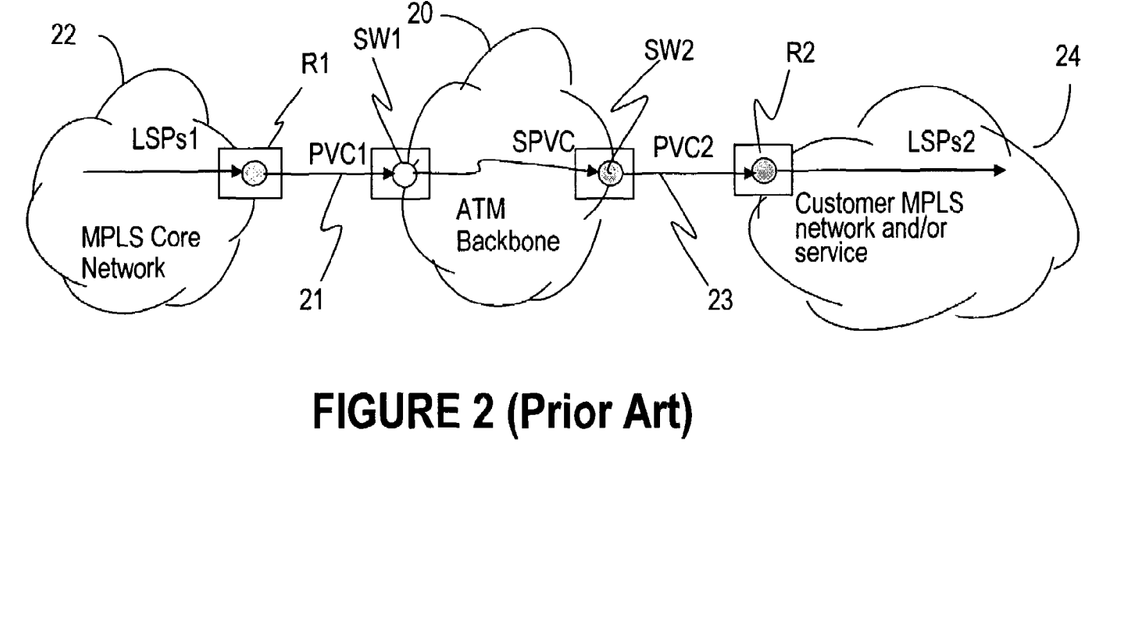
FIG. 2 shows an example of how the MPLS services are extended over an ATM network currently (prior art)

FIG. 2 shows another example, where MPLS services offered to customers of a MPLS network 24 need to transit from a MPLS network 22 over an ATM backbone (transport) network 20. LSPs inherently carry a full gambit of services (e.g. IP VPNs, VPLS, and Pseudo Wires), which can then be extended to remote or customer MPLS based networks, over an intervening ATM network, without the MPLS network knowing about the ATM network in between the customer networks. The ATM network 20 appears in this scenario due to existing infrastructure and architectures where ATM makes sense, or where ATM is the only technology available for extending these services.

Different scenarios are also currently used for carrying the IP/MPLS traffic to and from the ATM backbone network 20, such as for example, using a PVC, or Frame Relay (F/R), or using an Ethernet interface with a VLAN into to the ATM network. The current specification describes one such way for simplicity, while enabling a better understanding of the present invention and its advantages over the existing solutions. FIG. 2 shows PE routers R1 and R2 on two respective MPLS network 22, 24 and switches SW1 and SW2 on an ATM network 20. FIG. 2 also shows generically a plurality of ingress LSPs denoted with LSPs1 that carry traffic from customers across MPLS network 22 to PE router R1, and a plurality of egress LSPs denoted with LSPs2 that carry traffic from PE router R2 to customers of MPLS network 24. In prior art, there is no way to differentiate the LSPs1 or LSPs2 into sub-LSPs and assign those to specific LSPs. It is to be noted that the terms "ingress" and "egress" are relative terms, used to describe how user data is transported from customers of network 22 to customers of network 24 in the particular example of FIG. 2, where the source of the traffic is in MPLS network 22 and the destination is in network 24.

In this example, the MPLS packets carried by the LSPs arriving at PE router R1 in MPLS network 22 need to be terminated at PE router R1, and restored at PE router R2 in MPLS network 24. Thus, an operator needs to configure an ATM link 21 between MPLS network 22 and ATM network 20, as shown by the PVC1. PVC1 is manually and permanently established by the network operator between the PE router R1 and the multi-service switch SW1 at the edge of the ATM network 20. Similarly, the operator needs to configure another PVC between the multi-service switch SW2 and the PE router R2, as shown at 23 on FIG. 2. PVC2 carries the traffic between the ATM backbone network 20 and the MPLS network 24. Finally, the operator needs to set-up the two end points for an SPVC on the respective switches SW1 and SW2 to carry the data across ATM network 20. In the example shown in FIG. 2, an SPVC is setup between switch SW1 and a far end switch SW2 providing connectivity from PVC1 to PVC2.

After the datapath is configured as described above, the MPLS packets arriving at R1 over the LSPs1 are encapsulated into ATM AAL5 packets and transmitted towards the ATM network over PVC1. Then, the traffic is switched at SW1 onto the SPVC that carries it across network 20 and to R2 of MPLS network 24 over the PVC2. At the far-end router R2, the MPLS packets are extracted from the AAL5 frame and the labels in the packet are then used to send the MPLS packets over the LSPs2 to the correct users in MPLS network 24. The labels or label stacks associated with the IP packets in MPLS network 22 are carried in this architecture between the two MPLS networks by the ATM cells together with the payload.

There are several disadvantages to the solution shown in FIG. 2. To list a few, it requires MPLS/ATM interfaces on routers R1 and R2 to connect to the ATM network, which increases the cost of the overall solution. Also, this solution results in a single point of failure on links 21 and 23 connecting the MPLS networks to the ATM network. As a result, the only resiliency available is to use Automatic Protection Switching (APS), which is again more costly, especially as this requires more ATM interfaces on the routers. Finally, there is no way to differentially treat the LSPs coming from network 22 depending on QoS or bandwidth requirements. This is because all LSPs1 are treated in the same way, since only one PVC and SPVC are used.

Another solution would be to provide a GigE or POS interface between ATM network 20 and each of the MPLS networks 22 and 24 on links 21 and 23. GigE and POS are packet technologies, cheaper to deploy, and provide the ability to leverage MPLS resiliency (e.g. fast reroute FRR or backup LSPs) to protect against failures; these advantages are well understood in the industry. However, the problem with GigE or POS interfaces 21, 23 is that the multi-service switches SW1 and SW2 that are used in the ATM network for this interconnect need to perform many functions of a PE router and the core network 20 needs to also run P router functionality to overlay a full IP/MPLS implementation over the existing ATM network. These functions and network overlay are more advanced and require additional investments on multi-service switches.

On the other hand, the trend is to invest less in multi-service switches not more with regard to IP/MPLS. Therefore, it would be ideal to leverage existing capabilities of multi-service switches and minimize requirements for transporting IP/MPLS to remote sites over an ATM backbone. Also, the trend is to provide differentiated LSP services to customers (e.g. satisfying Qos and bandwidth constraints on a per LSP basis across the ATM network), in order to better serve their needs.

As indicated above, this invention is concerned with extending the reach of IP/MPLS based services over an ATM backbone (consisting of multi-service switches), without requiring the nodes to participate in the full PE function of the IP/MPLS based service, or without requiring an ATM link between the MPLS network and ATM network. Specifically, this invention intends to transport an MPLS LSP or an LSP stack (i.e. an outer tunnel with some number of inner LSPs) over an ATM backbone using a single SPVC. It is to be noted that the invention may equally be used for extending IP/MPLS services reachability using SVCs over the ATM backbone; the ensuing discussion and the examples provided in the drawings refer to SPVCs only for simplification and because this is the primary service offering of current ATM based networks.

Figure 3:
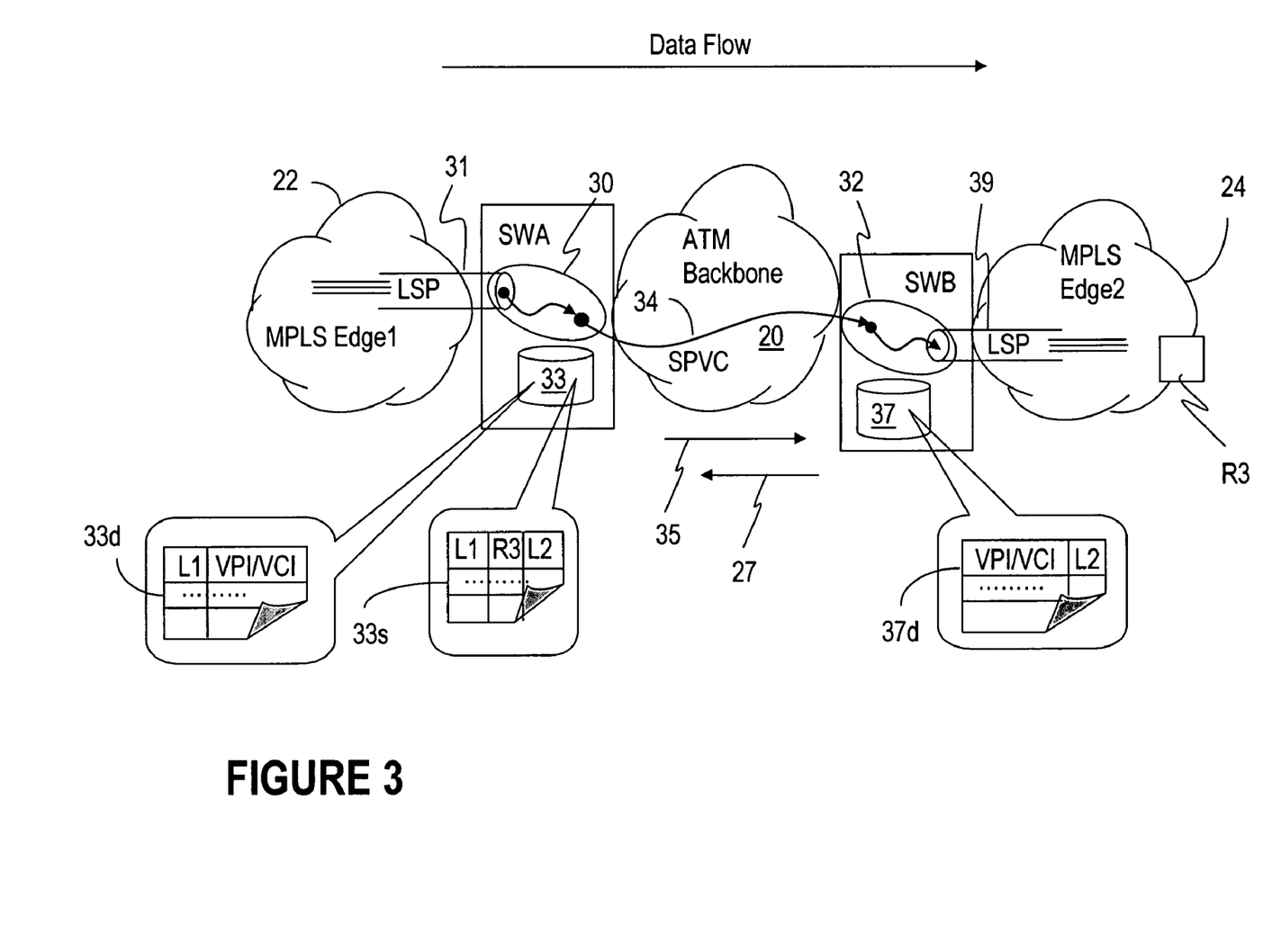
FIG. 3 shows extending LSPs across an ATM network, for a unidirectional flow.

The invention enables a single LSP or a single LSP stack (e.g. as in the case where multiple labels are pushed on the label stack to identify an inner LSP) to be mapped directly to an SPVC and carried over the ATM network using the service category and bandwidth assigned to that SPVC. FIG. 3 illustrates the solution according to the invention for a single LSP and a unidirectional flow. The architecture illustrated in FIG. 3 uses switches SWA and SWB, which are multi-service switches available on the market (e.g. Alcatel switch 7670 RSP). As indicated above, multi-service switches are capable of running both MPLS and ATM protocols; in this invention the functionality of these switches is further expanded with the ability to move the traffic between LSPs and SPVCs/SVCs with minimal changes, while providing differentiated LSP services mentioned in the previous paragraph.

In the embodiment of FIG. 3, an LSP 31 terminates on a first multi-service switch SWA provided at the edge of the ATM network 20, and re-starts as LSP 39 from a second multi-service switch SWB. To ensure traffic continuity between the two LSPs, a unidirectional SPVC denoted with 34 is set-up between multi-service switches SWA and SWB by associating LSP 31 on SWA to LSP 39 on SWB. It is to be noted that the association between SPVC 34 and LSP 31 on SWA can be made for just the outer label of the LSP 31, thereby all inner LSPs are carried "inside" this LSP. Similarly, the association between SPVC 34 to LSP 31 on SWA can be for a combination of outer and inner label (e.g. a pseudo wire) to be carried over the single SPVC. As well, the same or different SPVC to LSP associations can be made on SWB when terminating the SPVC and mapping it to LSP 39, where LSP 39 can be an outer label LSP or a specific label stack of multiple labels if for example LSP 31 is to be tunneled through another LSP. It is also to be noted that the LSPs 31 and 39 could each be a single LSP or a plurality of nested LSPs carrying traffic in the respective MPLS network 22, 24.

FIG. 3 illustrates a source endpoint 30 configured at multi-service switch SWA and a destination endpoint 32 configured at multi-service switch SWB. We note that the terms "source" and "destination" refer to the creation of the SPVC where the SPVC is launched or sourced from the source node source; however endpoints 30 and 32 have a more complex functionality, as discussed in more details in connection with FIG. 4.

For enabling extension of the MPLS services carried by LSP 31 over ATM network 20 to an end-user R3, the endpoints are provided with mapping and MPLS tables, as shown generically by memory 33 at SWA and memory 37 at SWB. While data (traffic) continuity is enabled by use of the mapping tables 33d and 37d ("d" from data), MPLS table 33s ("s" from signaling) contains MPLS specific data for identifying the end user of data carried by LSP 31, which is in this example R3, and the label L2 used by the LSP 39. Table 33s is used by SWA to establish SPVC 34 by including information from table 33s in a modified setup message towards SWB to then populate table 37d once the SPVC is connected. Also during SPVC establishment 33d is populated with the label L1 of the LSP 31 and VPI VCI to be used for transmission after the SPVC is connected. After the SPVC is connected, end user identification in tables 33d and 37d enables destination endpoint 32 to associate LSP 31 with LSP 39, which LSP 39 transports the data to end user R3.

Mapping table 33d enables endpoint 31 on multi-service switch SWA to map MPLS PDUs (protocol data units) arriving on LSP 31 to unidirectional SPVC 34. At the other end of the SPVC, mapping table 37d enables endpoint 32 on multi-service switch SWB to map ATM PDUs arriving over the SPVC connection 34 to egress LSP 39.

As known, an SPVC is established using a setup message generated at the source switch, here multi-service switch SWA, after a routing entity (e.g. PNNI routing) identifies a path available for the SPVC setup message starting from the source switch, passing thorough a plurality of intermediate switches and arriving at the destination switch. Once the SPVC setup message arrives at its destination, here multi-service switch SWB, SWB transmits back a connect message that establishes all cross-connects at all switches along the path, so that the data can flow from source to destination. The setup message sent by the source node includes the source and destination addresses and connection identifiers (VPINCI), AAL parameters, ATM traffic descriptor, QoS parameters, in other words all information necessary to establish the SPVC.

The invention uses a modified SPVC setup message 35, also referred to as an information element (IE), which includes in addition to a conventional SPVC setup message, LSP specific data (information). The LSP information includes the addresses of a destination router R3 and LSP label information L2 (transport label or the full label stack). This information, which is maintained in the MPLS table 33s at the source endpoint 30 is appended to the conventional SPVC setup message. The information in the modified setup message 35 is then used by SWB to find and connect the SPVC to the correct LSP.

To summarize, for the unidirectional scenario shown in FIG. 3, the SPVC connection 34 is mapped at the source endpoint 30 to LSP 31, where the incoming traffic from the LSP 31 is switched to the SPVC. The SPVC connection carries this traffic through the ATM network 20, and at the destination endpoint 32 multi-service switch SWB switches the traffic into LSP 39. SPVC 34 is mapped to LSP 39 based on the label information transmitted with the IE (the modified setup message that includes information from table 33s) 35 used to establish the SPVC. At multi-service switch SWB, the label stack pertinent to LSP 39 is added to the payload (AAL5 to MPLS packets transfer), and the packets are then sent on LSP 39 towards the MPLS network to router R3.

As evident from FIG. 3, there is no single point of failure in this scenario since fast reroute (FRR) can be provided on the MPLS side of the LSP to SPVC connection, and SPVC reroutes can occur on the ATM side. Similarly, APS is not needed between the MPLS network and the ATM network. In contrast with the currently used solutions, the solution of this invention does not require more costly ATM features on routers in the MPLS core or edge to connect to the ATM network. Instead, cheaper Ethernet or POS can be used from the MPLS edge to the ATM network. Also, it is now possible to better match SLA guarantees and service characteristics (e.g. QOS and bandwidth) for a specific LSP stack to an SPVC to better mimic that service over the ATM network. Still further, this solution is less expensive as no ATM configuration/management overhead needs to be added on the MPLS networks.

Figure 4:
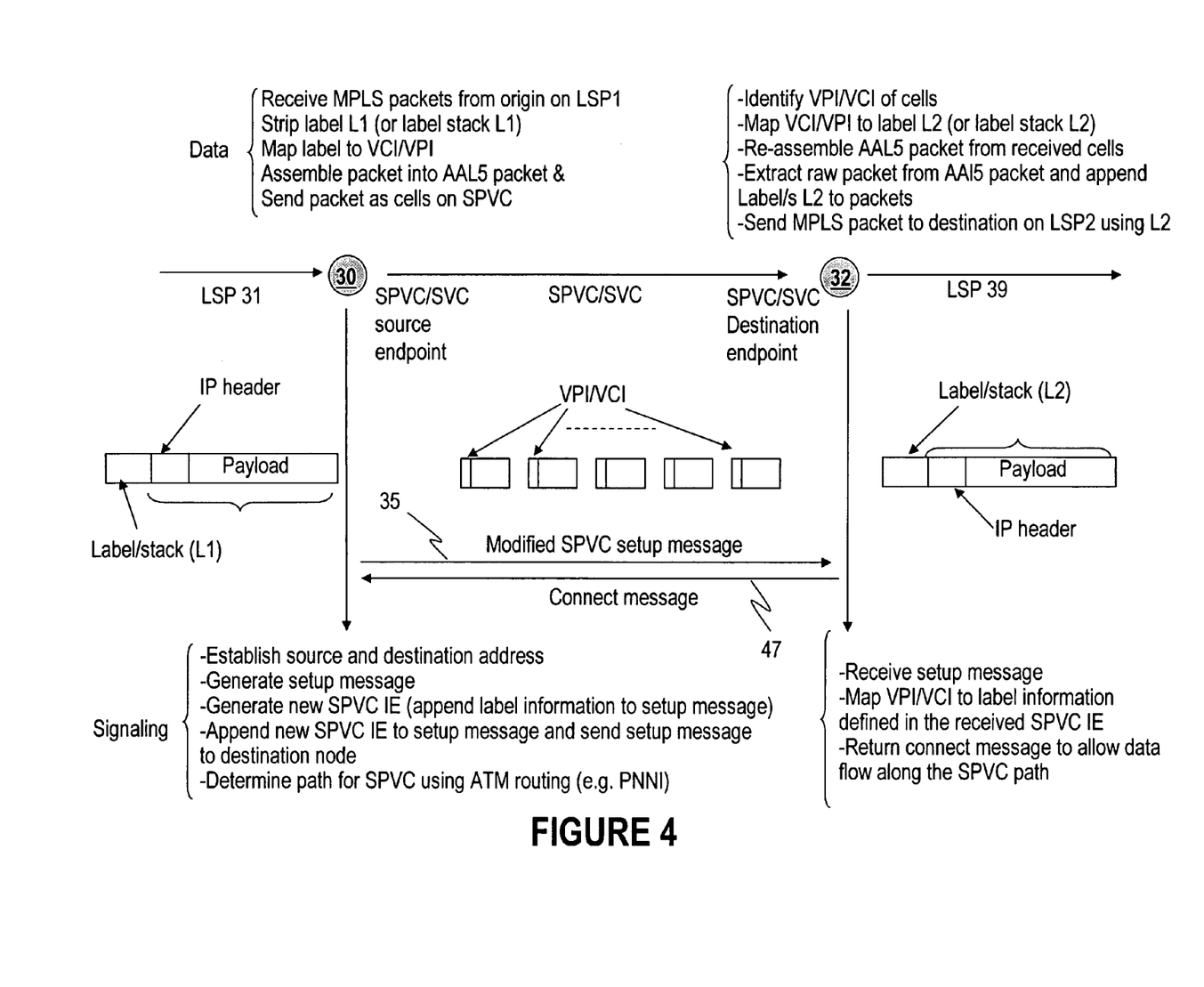
FIG. 4 illustrates processing of data and messaging according to an embodiment of the invention.

FIG. 4 shows in more detail the operations performed at the source and destination endpoints on the respective multi-service switches SWA and SWB. The upper part of this figure shows data processing and the lower part refers to signaling. With respect to data, at source endpoint 30, the label/stack L1 is stripped from the packets received from the end-user over LSP 31, and the packets are mapped to the VPI/VCI of the SPVC based on table 33d. Then the packets are assembled into AAL5 packets and are sent as cells over the SPVC to the destination endpoint 32. At the destination endpoint, the VPI/VCI of the cells is mapped to the label L2 of the LSP2, the cells are re-assembled into AAL5 packets and the label L2 is appended to the packets. Finally, the MPLS packets are sent to the destination R3 over LSP 39.

With respect to the signaling, as indicated above, the operator configures the source and destination of the SPVC on the respective edge switches SWA and SWB. Then, the modified setup message obtained by appending the LSP specific information to the PNNI setup message is sent from source endpoint 30 to the destination endpoint 32. On receipt of the modified setup message, destination endpoint 32 maps the VPI/VCI to the LSP specific information from the modified setup message. This information is then to be used for correctly labeling the MPLS packets. The destination endpoint 32 then returns the connect message, which establishes all cross-connects at the intermediate switches. Now, data can flow between the end-users.

Figure 5:
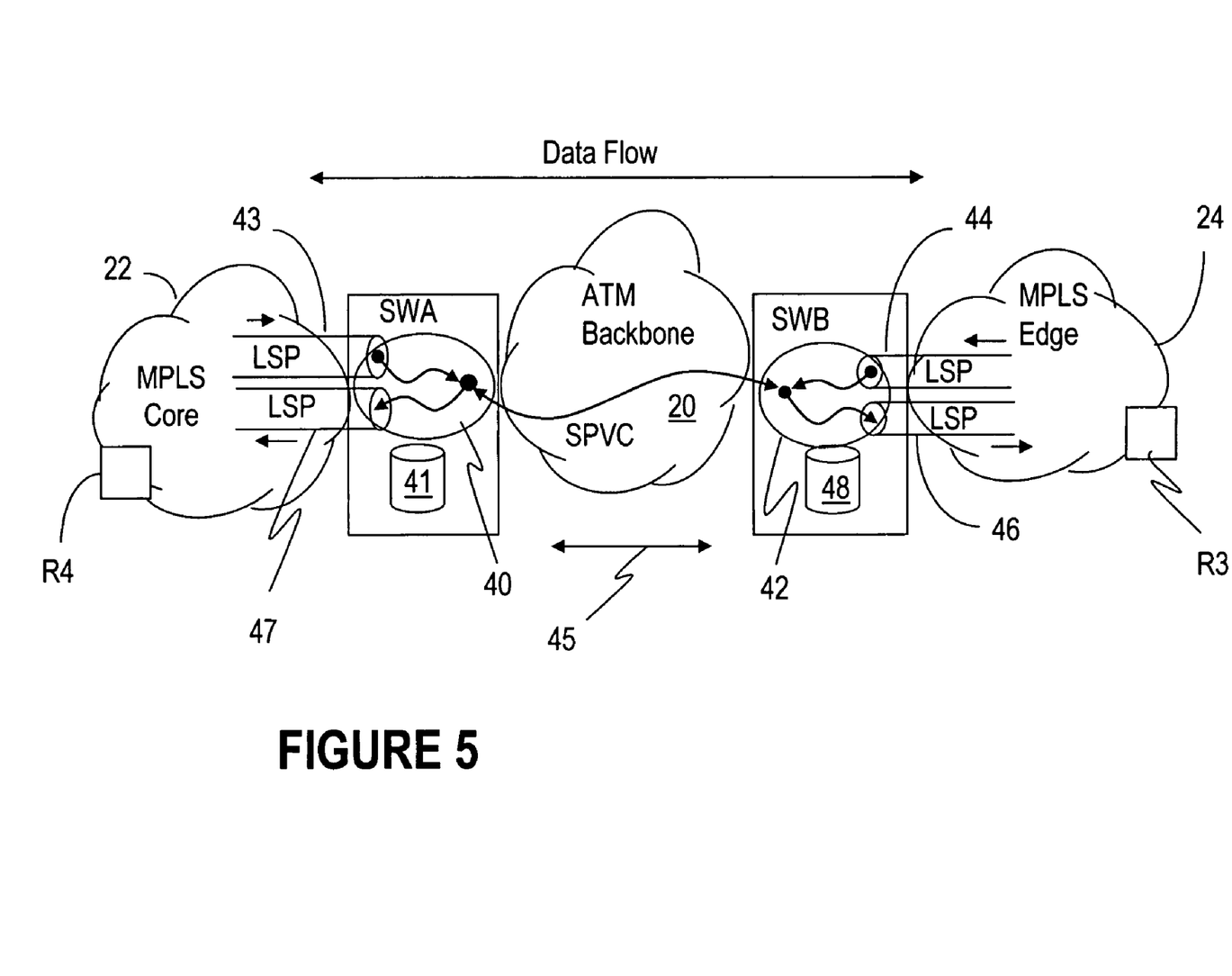
FIG. 5 illustrates extending LSPs across an ATM network, for a bidirectional flow.

FIG. 5 illustrates the invention for a bidirectional service, where the destination end users are an end user R3 in MPLS network 24 for the forward direction from MPLS network 22 to MPLS network 24, and an end user R4 in MPLS network 22 for the reverse direction from network 24 to network 22. It is to be noted that the model for bidirectional service is very similar to that of unidirectional service. In this case, the mapping table at source endpoint 40 is defined for both the ingress LSP 43, and the egress LSP 47. As well, the MPLS table in this scenario maintains the MPLS specific data (transport label or the full label stack) for identifying the end user of data carried by LSP 43, which is in this example R3 . Similarly, the mapping table at the destination endpoint 42 of the SPVC is defined by both the ingress LSP 44, and the egress LSP 46, and the MPLS table maintains the MPLS specific data for identifying the end user of data carried by LSP 44, which is in this example end user R4. FIG. 5 does not illustrate the table distinctly but it shows the respective memories 41 and 48 holding these tables. It should be clear to those experienced in the art that these tables would be similar to tables 33d and 37d from FIG. 3.

As in the case of setup message 35, the modified setup message 45 includes in addition to conventional bidirectional SPVC setup message information, LSP specific data. The LSP information appended to the conventional SPVC setup message includes the addresses of the destination routers R3 and R4. The information in the setup message 45 is then used by the endpoints 40 and 42 to find and connect the SPVC to the correct LSPs.

Figure 6:
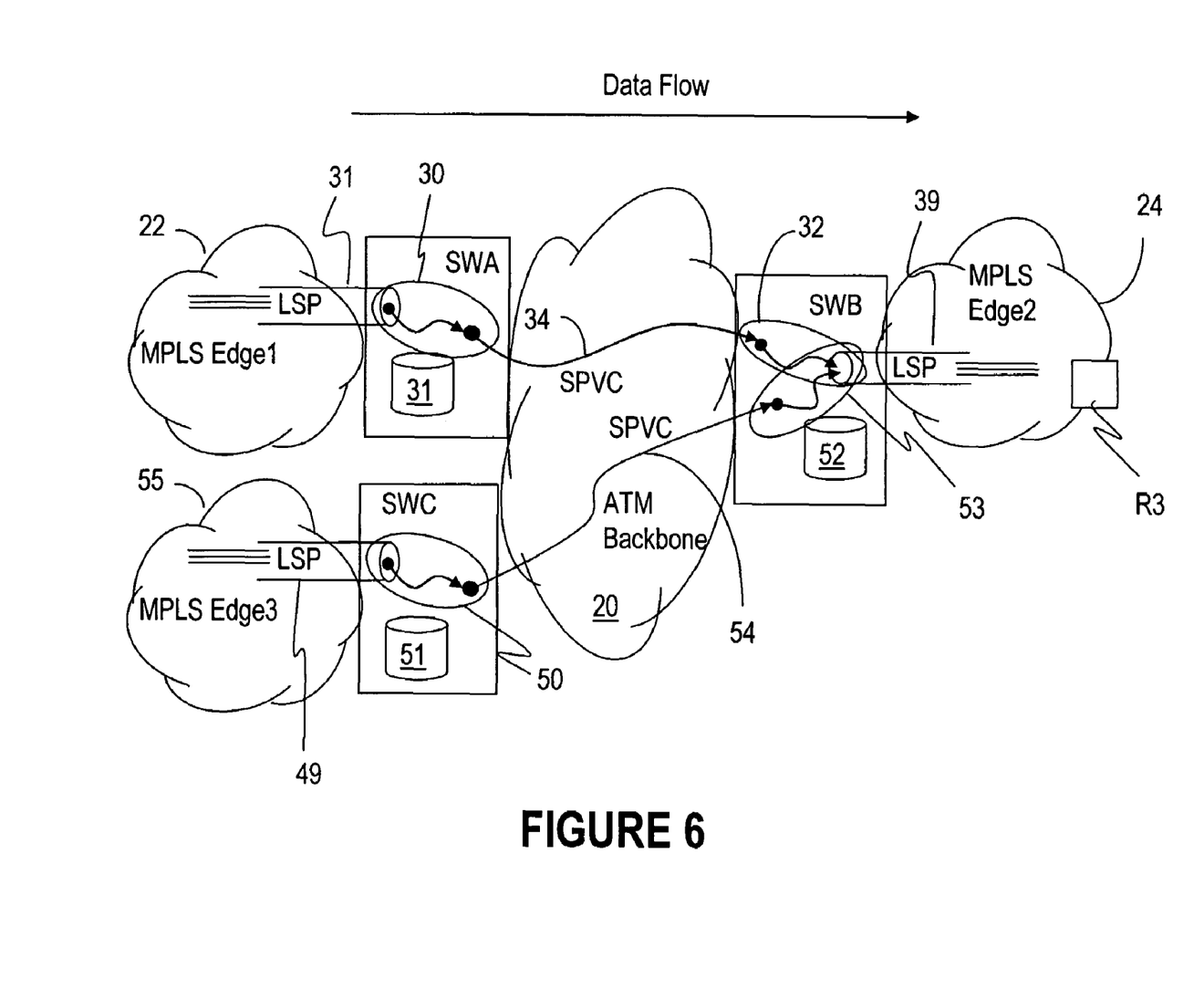
FIG. 6 illustrates how the invention can be extended to allow for multi-point to point type services over ATM networks, common in L3 VPNs.

FIG. 6 shows how the invention can be extended to allow for multi-point to point type services over ATM networks, common in L3 VPNs. The example of FIG. 6 shows unidirectional traffic flows for simplicity; it is to be noted that bidirectional traffic may equally be established, based on the bidirectional configuration shown in FIG. 5. In FIG. 6, an additional MPLS MPLS network 55 is connected over an ATM backbone 20 to MPLS network 24. MPLS network 55 terminates an LSP (or LSP stack) 49 on multi-service switch SWC connected at the edge of the ATM network 20; the traffic carried by this LSP is transported to an end-user R3 in MPLS network 24. To this end, a second SPVC is established by configuring a source endpoint 50 on switch SWC and an additional destination endpoint 53 on SWB. The modified setup message transmitted from SWC to SWB provides LSP specific information to SWB, so that this multi-service switch is able to map the traffic to the correct egress LSP and deliver the traffic to end user R3.

To summarize, the new type of SPVC/SVC according to the invention is capable of mapping MPLS packets from an ingress LSP at the SPVC/SVC source endpoint and to perform the opposite function on the SPVC/SVC destination endpoint by mapping the SPVC to an egress LSP. This can be accomplished without involving PE functionality or full IP routing on the multi-service switches SWA and SWB. Also, in order to setup this type of SPVC/SVC, the invention uses a new SPVC PNNI information element (IE) for signaling the MPLS label stack to the ATM destination endpoint from the ATM source endpoint when the SPVC is being established. The source and destination endpoint of the SPVC could be identified using an NMS system and the SPVC would be routed through the ATM network using normal PNNI techniques.

This invention allows service providers to extend MPLS based services (anything that rides over an LSP, e.g. VPLS, IP VPNs, pseudo wires, etc.) over an ATM backbone to locations or regions where using the ATM backbone makes more sense, while maintaining specific QOS and bandwidth guarantees per LSP or LSP label stack.

I claim:

1. A method of transporting MPLS protocol data units (PDU) from a first MPLS network to a destination in a second MPLS network across an ATM network, said method comprising:

establishing a source edge and a destination edge, said source edge being provided on a source multi-service switch and said destination edge being provided on a destination multi-service switch, said source and destination edges being connected at opposite edges of said ATM network;

at said source edge, generating a modified setup signal for identifying a path for a virtual circuit across said ATM network from said source edge to said destination edge;

transporting, within said modified setup signal, LSP-specific data from said first edge to said second edge for enabling transmission of said MPLS PDUs to said destination in said second MPLS network using an ATM signaling protocol, wherein said LSP-specific data comprises an address of said destination in said second MPLS network, ingress label information, and egress label information necessary for routing said MPLS PDUs in said second MPLS network; and stripping, at said source edge, ingress labels used by said MPLS PDUs within said first MPLS network.

2. The method of claim 1, wherein said ingress label information includes a transport label used by said MPLS PDUs in said second MPLS network.

3. The method of claim 1, wherein said ingress label information includes a label stack used by said MPLS PDUs in said second MPLS network.

4. The method of claim 1, wherein said step of stripping comprises maintaining, at said source edge, a first data mapping table with correspondence between identification data for said virtual circuit and an ingress label used by said MPLS PDUs within said first MPLS network.

5. The method of claim 1, wherein said step of stripping comprises maintaining, at said destination edge, a second data mapping table with a correspondence between identification data for said virtual circuit and an egress label used by said MPLS PDUs in said first MPLS network.

6. The method of claim 1, wherein said virtual circuit is one of a soft permanent virtual circuit (SPVC) and a switched virtual circuit (SVC).

7. The method of claim 1, further comprising:
setting-up said virtual circuit along said path between said first and second edges, wherein said virtual circuit is created after said destination edge sends a connect message to said source edge using said ATM signaling protocol;
mapping, at said source edge, said MPLS PDUs from an ingress LSP onto said virtual circuit;
carrying said MPLS PDUs from said source edge said destination edge over said virtual circuit; and
at said destination edge, mapping said MPLS PDUs from said virtual circuit to an egress LSP, based on said LSP-specific information received in said modified setup message.

8. The method of claim 7, wherein said ingress and egress LSP are nested LSPs.

9. The method of claim 7, wherein said step of carrying comprises, at said source edge:
segmenting said stripped MPLS PDUs into ATM PDUs;
inserting identification data for said virtual circuit into the header of said ATM PDUs; and
transmitting said ATM PDUs along said virtual circuit towards said destination edge.

10. The method of claim 9, wherein said step of mapping at said destination edge of said MPLS PDUs from said virtual circuit to said egress LSP comprises, at said destination edge:
receiving said ATM PDUs along said virtual circuit from said source edge;
obtaining said identification data for said virtual circuit from the header of said ATM PDUs;
accessing a destination mapping table for obtaining said egress label based on said identification data for said virtual circuit;
assembling said MPLS PDUs from said ATM PDUs and appending said egress label to said MPLS PDUs; and
transmitting said MPLS PDUs along said egress LSP.

11. The method of claim 1, wherein said source and destination edges are identified using a network management system.

12. The method of claim 1, further comprising using a fast reroute (FRR) protocol for rerouting said ingress and egress LSPs in case of a failure and using a SPVC reroute when a failure occurs in said ATM network.

13. The method of claim 1, wherein said transporting step uses PNNI as said ATM signaling protocol.

14. A multi-service switch connected at the edge of an ATM network for extending IP/MPLS service reachability over an ATM network, comprising:
means for configuring a source edge for a virtual circuit originating at said switch;
a MPLS table for maintaining an association between ingress label information used by MPLS PDUs received at said source edge and LSP-specific data;
a source virtual circuit mapping table for maintaining an association between ingress label information used by MPLS PDUs received at said source edge and identification data for said virtual circuit;
means for generating a modified setup message by appending said LSP-specific data to a virtual circuit setup message and transmitting said modified setup message over said ATM network to a destination edge in said ATM network using an ATM signaling protocol; and
means for mapping MPLS PDUs received at said source edge to ATM PDUs using said source virtual circuit mapping table, and transmitting said ATM PDUs from said source edge to said destination edge over said virtual circuit, wherein said ingress labels are stripped from said MPLS PDUs.

15. A multi-service switch connected at an edge of an ATM network for extending IP/MPLS service reachability over an ATM network, comprising:
means for configuring a destination edge for a virtual circuit terminating on said switch;
a destination virtual circuit mapping table for maintaining an association between identification data for said virtual circuit and egress label information used by MPLS PDUs transmitted from said destination edge;
means for generating a connect message in response to a modified setup message for establishing said virtual circuit between a source edge of said virtual circuit in said ATM network and said destination edge; and
means for mapping ATM PDUs received over said virtual circuit to MPLS PDUs using said destination virtual circuit mapping table, and transmitting said MPLS PDUs over an egress LSP, wherein said egress label information and an address of a destination in a destination MPLS network are appended to said MPLS PDUs.

* * * * *

UNITED STATES PATENT AND TRADEMARK OFFICE
CERTIFICATE OF CORRECTION

PATENT NO. : 7,643,499 B2 Page 1 of 1
APPLICATION NO. : 11/477614
DATED : January 5, 2010
INVENTOR(S) : Carl Rajsic It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of December, 2010

David J. Kappos
*Director of the United States Patent and Trademark Office*